June 29, 1943.    T. B. FLANAGAN ET AL    2,323,023
AUTOMATIC WEIGHING MECHANISM
Filed April 7, 1941    3 Sheets-Sheet 1

Inventors
THOMAS B. FLANAGAN
RICHARD T. POUNDS
By W. S. McDowell
Attorney

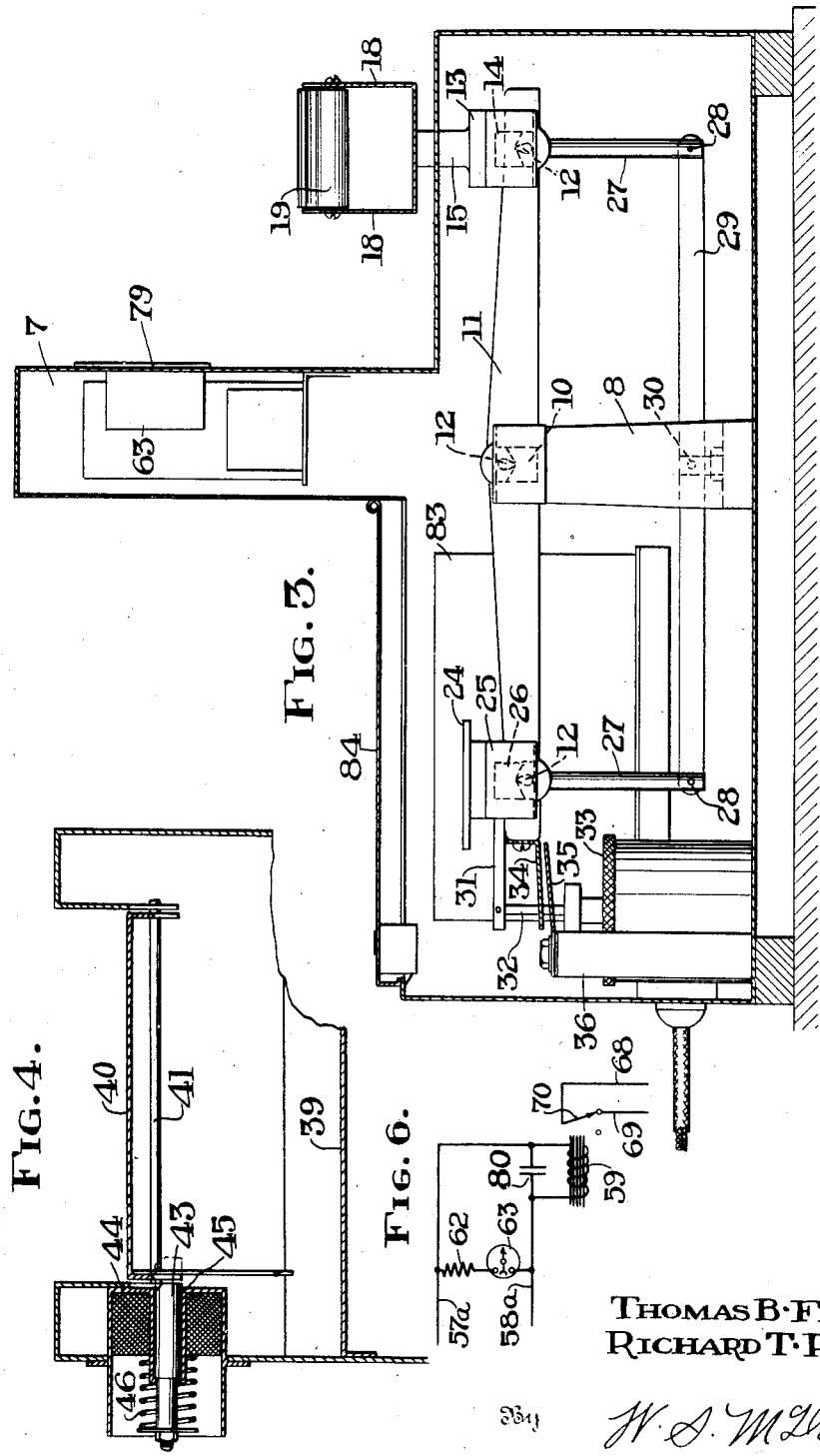

FIG. 5.

Patented June 29, 1943

2,323,023

UNITED STATES PATENT OFFICE 2,323,023

AUTOMATIC WEIGHING MECHANISM

Thomas B. Flanagan and Richard T. Pounds, Columbus, Ohio, assignors to The Exact Weight Scale Company, Columbus, Ohio, a corporation of Ohio Application April 7, 1941, Serial No. 387,285

3 Claims. (Cl. 209—121)

This invention relates generally to weighing devices and is particularly directed to a mechanism for weighing and sorting packages or articles according to weight during movement thereof without requiring the attention of an operator or workman.

One of the primary objects of the invention resides in the provision of a weighing device having electrically energized means for selecting packages or articles weighing a certain or predetermined amount and rejecting those of less weight or, in certain circumstances, those either under or over the predetermined weight, the electrically energized means being controlled by the movement of a part of the scale in response to the disposition of a package to be weighed on the load receiver of the scale.

Another object resides in the provision of a scale having a load receiver over which packages or articles to be weighed may move without interruption, the scale also being provided with electrically actuated means for separating packages of different weights, the electrical means having no positive connection or engagement with the operable elements of the scale.

A further object rests in providing a scale of any suitable type with an electrical circuit for controlling the operations of package selecting means, the electrical circuit including a source of alternating current of any desired frequency, a unit offering predetermined reactance to said current source and means for varying the reactance of said unit, the latter means being operated by the movement of a part of the scale mechanism, the circuit including certain elements and being so arranged as to be unaffected in operation by fluctuations in line voltage of the power supply.

A more specific object resides in the provision of a scale having a pivoted beam on one end of which is mounted an inclined load receiver, the discharge side of this member registering with an inclined slide having a spring pressed trap door, a solenoid operated lock being provided to resist movement of the door when packages of a predetermined weight pass over the load receiver and permit movement thereof when packages under said weight pass over the load receiver, the solenoid for the lock being disposed in an electrical circuit including an oscillator coil, a frequency discriminator transformer, diode rectifiers, resistors and a plurality of condensers, one of the latter being of the variable type and actuated by the movement of the scale beam when a load is applied to and removed therefrom.

Other objects will be made apparent by the following description and the accompanying drawings in which a scale formed in accordance with the invention has been illustrated.

In the drawings:

Fig. 3 is a vertical longitudinal sectional view taken on the plane indicated by the line III—III of Fig. 2;

Fig. 4 is a detail sectional view taken on the plane indicated by the line IV—IV of Fig. 2;

Fig. 5 is a wiring diagram of the circuits used to actuate the article separating means;

Fig. 6 is a wiring diagram illustrating a portion of a slightly modified circuit arrangement which may be employed to actuate the separating means.

Figure 1:
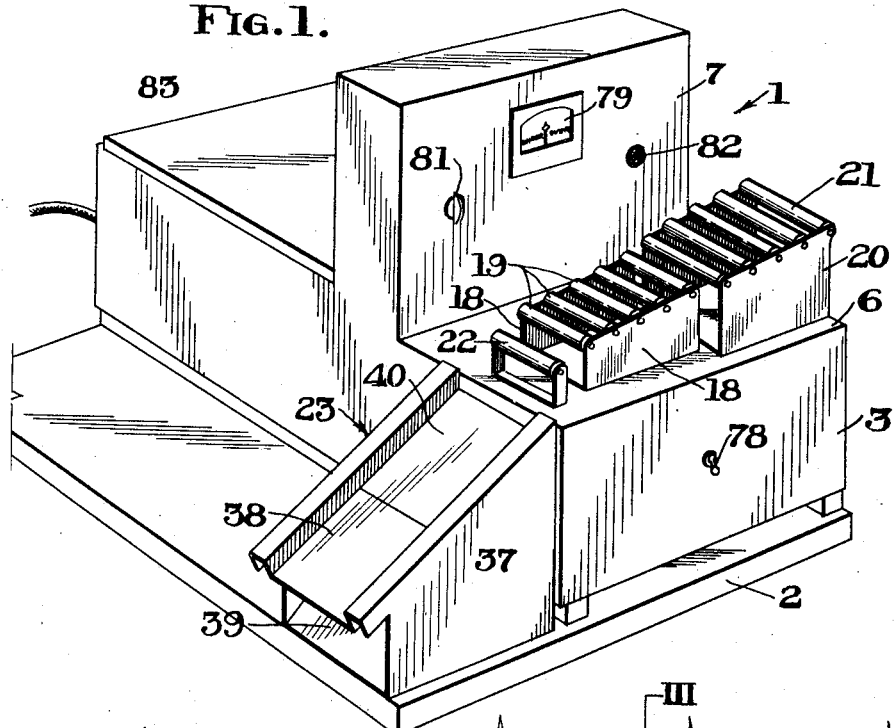
Fig. 1 is a perspective view of a weighing device formed in accordance with the present invention.
Figure 2:
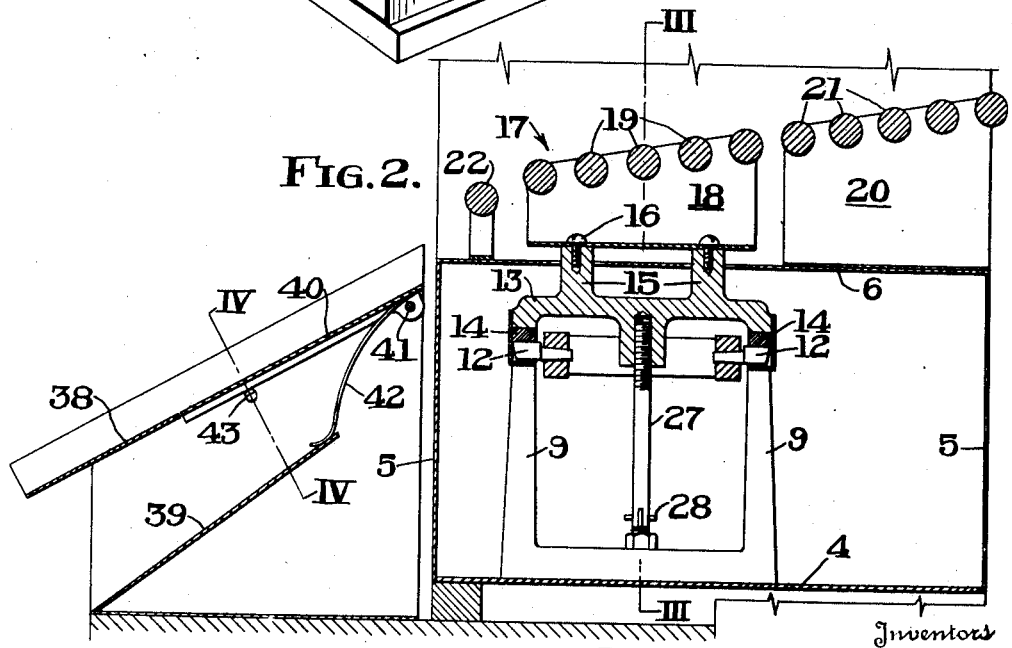
Fig. 2 is a vertical transverse sectional view taken through the commodity receiver of the weighing device and conveyor means for conducting articles to be weighed to and from the receiver.

Referring more particularly to the drawings, the numeral 1 designates the scale in its entirety. This scale is mounted on a suitable platform 2 and includes a housing 3 having a bottom wall 4, side walls 5 and a top wall 6, the latter wall terminating at its rear portion in an upwardly directed compartment 7.

Intermediate of its ends, the bottom wall 4 has a stand 8 secured thereto, this stand including spaced columns 9 having bifurcated upper ends for the reception of scale bearings 10. These members provide for the pivotal support of the scale beam 11 which is of the even balance type and has pivots 12 projecting from the central portion and from each end.

The pivots at the end of the beam adjacent to the forward portion of the scale housing receive a crosshead 13 having bearing members 14 for engagement with the pivots 12. The crosshead is also provided with a plurality of lugs 15 which project from the crosshead upwardly through openings formed in the top wall of the housing. These lugs have threaded openings for the reception of screws 16 by means of which a commodity receiver 17 is secured to the crosshead.

In this instance, the receiver 17 is formed from plate material and includes upwardly directed sides 18 between which antifriction rollers 19 are journaled in spaced relative order. The rollers are secured to the sides 18 in such manner that the pivotal axes are arranged in an inclined plane in order that when an article is placed on the rollers, it will gravitate to the lower side and move from the receiver.

The top wall 6 of the housing at one end of the receiver 17 is provided with a pair of upstanding plates 20 which are spaced to receive rollers 21 similar to those forming a part of the commodity receiver. These rollers are arranged in the same plane as the rollers of the platform and constitute a portion of a conveyor over which the articles to be weighed move to the receiver. After the articles leave the receiver, they move over another roller 22 to a separator, designated generally by the numeral 23, to be more specifically described hereinafter. The rear end of the beam 11 receives a predetermined weight receiver 24 which is carried by a crosshead 25 having bearing blocks 26 for engagement with the pivots 12 at the rear end of the beam. The crossheads 13 and 25 have depending rods 27, the lower ends of which carry pins 28 which project through the outer ends of a check link 29, this member being pivotally secured at its central portion to a rod 30 fixed to the stand 8.

The distances between the pivot at the central portion of the check link 29 and those at the outer ends thereof correspond to the distances between the fulcrum pivot of the beam and the pivots for the load receivers, the beam and the check link together with the rods 27 forming a parallelogram as is usual in scale construction. The rear end of the beam has an extension 31 secured thereto, the outer end of this member being pivotally connected with the end of a piston rod 32 forming a part of a dashpot 33 employed to dampen the oscillations of the beam.

The scale thus far described, with the exception of the commodity receiver is of standard construction and does not, per se, form a part of the patentable subject matter. The even balance scale construction disclosed has been selected for purposes of illustration only and it should be understood that any other type of weighing device, such as a spring or pendulum scale could be used with equal facility without departing from the concept of the present invention.

As shown in Fig. 3, the rear end of the beam is provided with a plate 34 arranged to be moved, upon movement of the beam, toward and away from another plate 35 carried by a post 36 projecting upwardly from the bottom wall of the scale. The plates 34 and 35 form a variable condenser by means of which the action of the separator mechanism 23 is controlled. The separator may be of many types, but the one selected for illustration is formed from sheet metal and includes spaced side walls 37 between which a pair of inclined slides 38 and 39 are supported in spaced superposed order. A gate member 40 is supported between the walls 37 and is mounted on a transversely extending pivot 41 which provides for movement of the gate from a position in registration with the first slide to a position in engagement with the bottom slide. The gate is normally held in its former position by a light spring 42, the strength of this member being such that when an article, weighing a fraction of an ounce or more, is positioned on the gate, it will move downwardly to permit the article to be deposited on the lower slide.

The scale illustrated in the drawings has been designed for checking the weight of packages or articles weighing three ounces or under but by increasing the strength of the various parts, the apparatus may be made applicable to articles of any weight.

When it is desired to cause the articles deposited on the gate 40 to move over the slide 38, a latch 43 is moved to a position where it will prevent the gate from moving. The article will then slide from the gate onto the member 38 and move thereover to a container or conveyor by means of which it will be conducted to a point of discharge. To move the latch 43, it is preferred to employ a solenoid winding 44 which extends around a guide 45 for the latch, the latter constituting the movable core of the solenoid and being normally held in a gate releasing position by a coil spring 46. When the coil 44 is energized, the latch core 43 will move from its retracted position to the position indicated in dotted lines in Fig. 4 wherein the gate will engage the same and be prevented from moving downwardly. After the coil has been deenergized, the spring 46 will move the latch to its normal position and the gate will again be free to move under the influence of weight applied thereto. Electric current is introduced to the winding 44 by the circuits indicated in Fig. 5.

As noted above, the latch is controlled by the movement of the condenser plates 34 and 35 in response to movement of the scale beam. In the operation of the weighing device, a known weight is applied to the receiver 24 and articles to be checked in weight are supplied to the upper end of the conveyor section 21. These articles will move one at a time over the conveyor 21 to the commodity receiver. If the article moving over the receiver does not correspond in weight to the known weight applied to the receiver 24, the condenser plates 34 and 35 will not be separated sufficiently to cause the coil 44 to be energized and the latch 43 will remain in its retracted position. When the package moves from the receiver onto the gate, this member will move downwardly and the under-weight package will be deposited upon the slide 39 and move thereover to a container for the under-weight packages. If the package applied to the receiver corresponds in weight to the known weight, the plates 34 and 35 will be separated the proper distance to provide for a flow of current to the winding 44 and the latch will be moved to its extended position to resist movement of the gate. The package thus actuating the scale will slide over the gate and the member 38 and be transported by suitable mechanism to the place for proper weight packages.

The condenser formed by the plates 34 and 35 is connected in a circuit having an oscillator coil 47, the ends of which are connected with an R. F. oscillator tube 48, one end of the coil being connected with the grid 49 and the other with the cathode of the tube 48, the cathode also being connected with the ground as at 48a. A pair of variable condensers 50 and 51 are shunted across the coil, the first being termed a main tank condenser and the second a shunt condenser. The circuit also includes an R. F. amplifier tube 52 through which the impulses generated by the oscillator are increased in intensity.

The anode of the amplifier tube is connected with a frequency discriminator transformer 53 which has a split secondary 54, the ends of the sections thereof being connected with a pair of diode rectifiers 55 and 56, these members being connected with a pair of vacuum tubes 57 and 58. The lines 57a and 58a leading from the anodes of the vacuum tubes 57 and 58 are connected with the field coil of a relay 59.

A copper oxide rectifier 59a is arranged in the line 57a leading from the anode of the vacuum tube 57, this member serving to restrict the operation of the relay when the D. C. bridge formed by the tubes 57 and 58 and the lines leading therefrom is unbalanced in one direction. The lines leading from the tubes have resistor elements 60, 61 and 62 connected therewith, the first two resistors being in one shunt line and constituting plate resistors and the other being in a second shunt line between the first shunt line and the relay. A zero center galvanometer 63 is also connected in the second shunt line, the resistor in this line being a current limiting resistor. A line 64 is connected with the first shunt line between the resistors 60 and 61 to complete the circuit thus far described and provide for current flow thereto from the main source.

The latch solenoid circuit includes the coil 44, a vacuum tube 65, the anode of which is connected with one end of the coil 44, a grid return resistor 66, a time constant condenser 67, a plurality of lines 68 and 69 and a switch arm 70, the latter constituting the armature of the relay 59 and serving, when in a closed position, to complete the circuit employed to directly control the operation of the latch solenoid. The line 68 is connected with the grid of the tube 65, the resistor 66 and the condenser 67, the latter elements being grounded as at 68a. The cathode of the tube 65 is connected by a line 65a with a tap on a series of resistors 71, one end of the series being connected with the ground and the other end being connected by a line 72 with a filter choke 73 which is arranged in a circuit 74 including a rectifier tube 75 and several sections of the secondary field of a main transformer 76.

The line 72 also connects the line 64 and the field winding of the latch solenoid with the transformer. The line 69 leading from the switch 70 of the relay is connected to the line 65a which extends from the cathode of the tube 65 to the resistors 71.

Another section of the secondary of the transformer 76 supplies low voltage current to the filaments of the vacuum tubes 48, 52, 57, 58, 65 and 75 and the diode rectifiers 55 and 56. The primary of the main transformer is supplied with 110 volt 50 to 60 cycle current from the usual commercial source by leads 77 and a switch 78 is arranged in one of these leads to control the flow of current to the transformer. When the switch 78 is closed and current is introduced to the main transformer, the circuits will be energized and impulses set up at a predetermined frequency in the oscillator circuit. The beam of the scale is balanced to the desired mechanical balance which will automatically bring the condenser formed by plates 34 and 35 to a predetermined value. The condenser 51 is then adjusted until the frequency of the oscillator circuit equals the frequency in the discriminator circuit. At this point, the diodes 55 and 56 receive equal voltages and their rectified output causes equal direct current voltages to be applied to the grids of vacuum tubes 57 and 58. Consequently, there is no voltage drop across resistor 62 and the galvanometer will therefore indicate zero.

As shown in Fig. 1, the galvanometer is positioned in the compartment 7 of the scale housing immediately behind a window 79 where the needle can be observed by the operator. When the beam is in balance, this condition will be indicated by the pointer of the galvanometer registering with the zero indication. When there is no voltage drop across the resistor 62, the relay will not be energized and therefore switch arm 70 will remain in engagement with the contact connected to the line 69. This position of the switch arm completes a circuit by which the grid voltage of tube 65 will be reduced and sufficient anode current will then be transmitted to the coil 44 to cause the operation of the latch. After the scale beam has been balanced, and the weight applied to the commodity receiver is removed, the device is in condition for operation.

By removing the weight, the beam will be unbalanced due to the known weight being arranged on the receiver 24. This side of the scale will be depressed, causing the plate 34 to move closer to the plate 35, thus lowering the frequency of the oscillator circuit below that of the discriminator circuit. This difference causes the discriminator transformer to supply diode rectifier 55 with a higher voltage than rectifier 56 and consequently, a higher negative voltage is applied to the grid of the vacuum tube 57 than to the grid of vacuum tube 58 whereby the D. C. bridge will be unbalanced with the positive side being on the line 57a leading from the tube 57. The voltage drop between lines 57a and 58a will register on the galvanometer and may be noted from the exterior of the scale by observing the position of the pointer through the window 79. The voltage drop is also applied across the sensitive relay 59 causing the switch arm 70 to move away from the contact connected with the line 69, thus breaking the circuit controlled by switch 70 and increasing the grid bias of tube 65 to such a point that a negligible current flows through the coil 44. Due to the disposition of the time constant condenser 67 in that circuit, the reduction of current flow to the coil 44 will be delayed. The purpose of this delay is to hold the latch in its extended position for a length of time sufficient to permit a package of proper weight to pass from the commodity receiver of the scale over the gate 40 to the slide 38. Through the employment of a pair of diode rectifiers and the balanced D. C. circuit as illustrated, fluctuations in the current supply will have no undesired effect on the operation of the mechanism.

In the operation of the device, articles to be weighed are supplied to the conveyor 21, one at a time. These articles move downwardly across the conveyor to the load receiver of the scale and are weighed without interrupting the movement of the same across the receiver. If the weight of the article on the receiver is sufficient to balance the known weight positioned on the other receiver, the condenser plates 34 and 35 will be separated a distance sufficient to cause the frequency of the oscillator circuit to equal the frequency of the discriminator circuit and balance the D. C. bridge. This condition in the bridge prevents current flow through the relay 59 and permits the switch arm 70 to close, thus shunting the supply of grid bias to the vacuum tube 65. Current then flows through the coil 44 and causes the latch to move to a gate securing position wherein the article will pass to the slide 38 after leaving the commodity receiver.

In the event a package or article moves onto the commodity receiver having a weight insufficient to balance the known weight placed on the receiver 24, the plates 34 and 35 will not be moved apart a distance sufficient to raise the frequency of the oscillator circuit to that of the discriminator circuit and the D. C. bridge will remain unbalanced, thereby permitting current to continue to flow through the relay which will hold the switch arm 70 in position to prevent the shunting of the grid bias supply of the vacuum tube 65. As previously mentioned, when this grid bias supply is maintained, the coil 44 will not be energized and the latch will remain in its retracted position wherein the gate 40 will be permitted to move in response to the weight of the package moving from the commodity receiver and this package will be deposited on the slide 39 for rejected packages. The latch is normally maintained in its retracted position and moves to its extended gate obstructing position each time an article of proper weight moves onto the commodity receiver.

Figure 5:
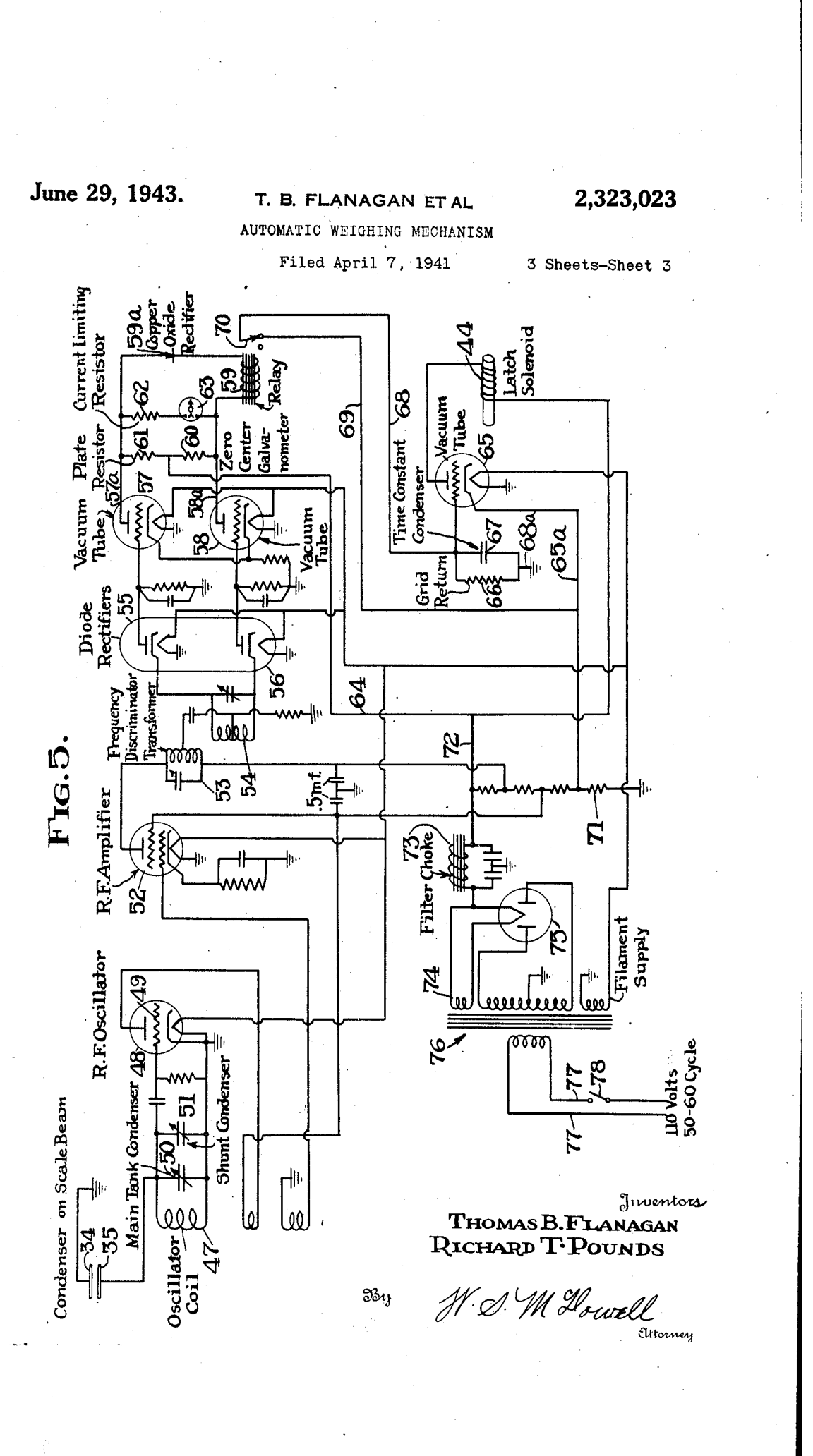

With the particular circuit arrangement illustrated in Fig. 5, the mechanism operates to reject only those articles or packages which do not possess sufficient weight to cause the condenser plates 34 and 35 to separate a distance sufficient to make the frequency of the oscillator circuit to equal that of the discriminator circuit. Thus, packages possessing weights greater than that for which the scale has been set will be selected the same as the packages corresponding to the predetermined weight. If it is desired to select only those packages which correspond to a predetermined standard of weight, the rectifier 59a, indicated in Fig. 5, may be omitted from the discriminator circuit as illustrated in Fig. 6 and current will be permitted to flow through the relay coil 59 when the D. C. bridge is unbalanced on either side, that is, when the voltage drop is from line 57a to line 58a or vice versa. When the rectifier 59a is employed, its characteristics will permit current to flow only in one direction. Thus when the voltage drop is from line 57a to line 58a, current will be permitted to flow through coil 59, but if the voltage drop is from line 58a to line 57a, rectifier 59a will not permit current flow.

By eliminating the rectifier 59a, a voltage drop in either direction will cause current flow through coil 59, and this current flow will only be interrupted when the frequencies of the oscillator and discriminator circuits are equal, which condition will occur only when the condenser plates 34 and 35 are spaced the proper distance. Normally, the plates 34 and 35 are spaced at such a distance that the frequencies of the oscillator and discriminator circuits are unequal and the D. C. bridge is unbalanced in one direction. If a package possessing a weight greater than the predetermined standard moves onto the commodity receiver, the plates 34 and 35 will be separated too much to cause the frequencies of the circuits to be equalized and the D. C. bridge will be unbalanced in the opposite direction. As the condenser plates are separating, they will, for an instant, be so spaced as to effect the actuation of the latch. To avoid this improper actuation, a condenser 80 may be shunted across the coil 59 between lines 57a and 58a. This condenser supplies sufficient current to the coil 59 while the D. C. bridge is momentarily in balance to prevent the release of the armature 70.

To facilitate the operation of the condenser 51 to balance the frequencies of the oscillator and rectifier circuits, the device has an adjusting knob 81 disposed adjacent to the window 79. This knob is connected with the condenser 51 and rotation of the knob will adjust the movable elements of the condenser. The casing is also provided with a jewel 82 in registration with a miniature lamp arranged in one of the electrical circuits to inform the operator when the electrical portion of the apparatus is energized. The switch 78 has its extremity disposed exteriorly of the casing to permit ready actuation when the scale is being set for operation.

The electrical elements are contained within the scale housing as indicated at 83 and the housing has a pivoted cover 84 to provide access thereto. The cover also permits access to the interior of the scale housing for the purpose of applying the known weights to the receiver 24.

Through the provision of an electrically controlled article separating device, the speed at which the articles may be supplied to the scale is limited only by the length of time required for the movable elements of the scale to assume the proper weight indicating position. By forming the various movable parts of the scale mechanism, per se, of light weight material, this length of time can be reduced to a minimum and a weight checking apparatus will be provided which will be readily adaptable to present day high speed production methods.

We claim:

1. Apparatus for separating articles according to weight comprising an even balance scale, a commodity receiver for said scale, said receiver forming a part of a conveyer line and over which articles to be weighed pass without interruption, article separating means at the discharge side of said receiver, said means having a spring pressed gate section, latch means normally positioned to permit movement of said gate section, electro-responsive means for moving said latch means to a gate obstructing position, and means for controlling the operation of said electro-responsive means, said control means having an oscillator circuit, a rectifying circuit normally in resonance with said oscillator circuit, a relay in said rectifying circuit, said relay being connected with said electro-responsive device and operating the same when the frequency of the oscillator circuit varies from the resonant frequency, and means connected with a movable part of said scale for varying the frequency of the oscillator circuit.

2. In apparatus for separating commodities according to weight, a scale having an even balanced beam, a receiver for known weights on one end of said beam, a commodity receiver on the opposite end of said beam, said commodity receiver forming a part of a conveyor line over which the articles being weighed move without interruption, means in the conveyor line at the discharge side of said commodity receiver for separating articles of undesired weight from the desired articles, and electrical means operated by the movement of the scale beam for controlling the operation of said article separating means, said electrical means having an oscillator circuit with a condenser therein operated by the scale beam to vary the oscillating frequency of said circuit, a discriminator circuit in resonance with said oscillator circuit when said beam is in balance, a relay operated by variations in frequencies between said discriminator and oscillator circuits, a circuit controlled by said relay for governing the operability of said article separating means, and means in said latter circuit for delaying the response of said article separating means following an operation of said relay.

3. In apparatus for separating commodities according to weight, a scale having an even balanced beam, a receiver for known weights on one end of said beam, a commodity receiver on the opposite end of said beam, said commodity receiver forming a part of a conveyor line over which the articles being weighed move without interruption, means in the conveyor line at the discharge side of said commodity receiver for separating articles of undesired weight from the desired articles, and electrical means operated by the movement of the scale beam for controlling the operation of said article separating means, said electrical means having an oscillator circuit with a condenser therein operated by the scale beam to vary the oscillating frequency of said circuit, a discriminator circuit in resonance with said oscillator circuit when said beam is in balance, a relay operated by variations in frequencies between said discriminator and oscillator circuits, a circuit controlled by said relay for governing the operability of said article separating means, said separating means being made operative when said oscillator and discriminator circuits are in resonance, and means in said latter circuit for retaining said separating means in operative condition following a variation in the oscillating frequency of said oscillator circuit for a length of time sufficient to permit an article to move from said commodity receiver to a point beyond said separating means.

THOMAS B. FLANAGAN.
RICHARD T. POUNDS.